(12) United States Patent
Morimura et al.

(10) Patent No.: US 7,203,816 B2
(45) Date of Patent: Apr. 10, 2007

(54) MULTI-PROCESSOR SYSTEM APPARATUS ALLOWING A COMPILER TO CONDUCT A STATIC SCHEDULING PROCESS OVER A LARGE SCALE SYSTEM OF PROCESSORS AND MEMORY MODULES

(75) Inventors: Tomohiro Morimura, Yokohama (JP); Hideharu Amano, Yokohama (JP)

(73) Assignee: Semiconductor Technology Academic Research Center, Kanagawa (JP)

( * ) Notice: Subject to any disclaimer, the term of this patent is extended or adjusted under 35 U.S.C. 154(b) by 734 days.

(21) Appl. No.: 10/085,132

(22) Filed: Mar. 1, 2002

(65) Prior Publication Data

US 2002/0147851 A1     Oct. 10, 2002

(30) Foreign Application Priority Data

Mar. 1, 2001   (JP)   ............................. 2001-056475

(51) Int. Cl.
*G06F 15/00*   (2006.01)
*G06F 15/16*   (2006.01)
(52) U.S. Cl. ........................................ 712/11; 709/201
(58) Field of Classification Search ........ 709/200–203; 712/10–11
See application file for complete search history.

(56) References Cited

U.S. PATENT DOCUMENTS

| | | | |
|---|---|---|---|
| 5,453,978 A | | 9/1995 | Sethu et al. |
| 5,581,777 A | | 12/1996 | Kim et al. |
| 5,945,922 A | | 8/1999 | Gao et al. |
| 6,031,835 A | * | 2/2000 | Abali et al. .................. 370/388 |
| 6,247,077 B1 | * | 6/2001 | Muller et al. .................. 710/74 |
| 6,606,326 B1 | * | 8/2003 | Herring ........................ 370/412 |
| 6,791,939 B1 | * | 9/2004 | Steele et al. ................. 370/217 |

FOREIGN PATENT DOCUMENTS

EP            0 676 703          10/1995

(Continued)

OTHER PUBLICATIONS

Iwai et al. Architecture of Complier-Initiative Type Multiprocessor ASCA; (English translation by Mcelroy Translation Company; 2000.*

(Continued)

*Primary Examiner*—Rupal Dharia
*Assistant Examiner*—Sean Reilly
(74) *Attorney, Agent, or Firm*—McDermott Will & Emery LLP

(57) ABSTRACT

A multi-processor system apparatus allows a compiler to perform a static scheduling action easily and can conduct the transfer of data packets without collision in response to a common pattern of simultaneous access demands. Processor elements are interconnected by a multi-stage interconnection network having multiple stages. As each of switching elements in the multi-stage interconnection network is preliminarily subjected to the static scheduling action of a compiler. The multi-stage interconnection network is emulated without producing collision of data. When the transfer of packets is carried out in one clos network arrangement of the multi-stage interconnection network, the scheduling of switching elements SE0 to SE3 in the exchanger at Level 1 is determined so that a packet lost in the arbitration is transferred through the free port of any applicable one of the switching elements.

5 Claims, 19 Drawing Sheets

FOREIGN PATENT DOCUMENTS

JP          7-282018          10/1995

OTHER PUBLICATIONS

Iwai, Keisuke., et al "An Interconnection Network of ASCA: a Multiprocessor for Multi-Grain Parallel Processing." Online! Feb. 1998, pp. 262-264, Retrieved form the Internet: URL: www.am.ics.keio.ac.jp/proj/asca/index-j.html>.

Iwai, Keisuke., et al. "A Custom Processor for the Multiprocessor System ASCA." 'Online! Feb. 1998, pp. 258-261, Retrieved form the Internet: URL: www.am.ics.keio.ac.jp/proj/asca/index-j.html>.

Kim, Soohong P., et al. "VLIW Across Multiple Superscalar Processors On A Single Chip." Parallel Architectures and Compilation Techniques., 1997. Proceedings., 1997 International Conference on San Francisco, CA, USA Nov. 10-14, 1997, Los Alamitos, CA, USA. IEEE Comput. Soc, US, Nov. 10, 1997, pp. 166-175.

Dietz, Henry G. and Schwederski, Thomas. "Extending Static Synchronization Beyond SIMD and VLIW." Purdue University School of Electrical Engineering. Technical Report TR-EE 88-25, Online Jun. 1988. http://dynamo.ecn.purdue.edu/{hankd/CARP/TREE88_25/standard.ps.Z> pp. 1-23.

Iwai, Keisuke, et al. "A Custom Processor For The Multiprocessor System ASCA" Proceedings of the lasted International Conference Applied Informatics. International Symposium on Parallel and Distributed Computing and Networks, Feb. 23, 1998, pp. 258-261.

Morimura, Iwai, K., et al. "ASCA: A multiprocessor architecture initiated by a compiler." 2000 pp. 1-8 (w/English Abstract).

Yasukawa, et al., "MINC: A Multistage Interconnection Network with Cache control mechanism", Keio University.

* cited by examiner

Fig.7

| OUTPUT PORT NUMBER | CURRENT TIME | HOLD PORT | HOLD CLOCK | PORT DEMAND WAITING QUEUE | STATUS |
|---|---|---|---|---|---|
| #0 | 157843 | #3 | 2 | - | HOLD |
| #1 | 157843 | - | 0 | #0,#2 | RELEASE |
| #2 | 157843 | - | 0 | #1 | RELEASE |
| #3 | 157843 | - | 0 | - | RELEASE |

Fig.11

| OUTPUT PORT NUMBER | CURRENT TIME | HOLD PORT | HOLD CLOCK | PORT DEMAND WAITING QUEUE | STATUS |
|---|---|---|---|---|---|
| #0 | 15000 | – | 0 | – | RELEASE |
| #1 | 15000 | – | 0 | #0,#1 | RELEASE |
| #2 | 15000 | #4 | 2 | #3 | HOLD |
| #3 | 15000 | – | 0 | – | RELEASE |
| #4 | 15000 | – | 0 | #2 | RELEASE |

Fig.12

| OUTPUT PORT NUMBER | CURRENT TIME | HOLD PORT | HOLD CLOCK | PORT DEMAND WAITING QUEUE | STATUS |
|---|---|---|---|---|---|
| #0 | 15000 | – | 0 | – | RELEASE |
| #1 | 15000 | #1 | 1 | – | HOLD |
| #2 | 15000 | #4 | 2 | – | HOLD |
| #3 | 15000 | – | 0 | – | RELEASE |
| #4 | 15000 | #2 | 1 | – | HOLD |

Fig.15

| CLUSTER NUMBER | DESTINATION CLUSTER NUMBER |
|---|---|
| A0 | A1,A3 |
| A1 | A2, A1, A1, A1 |
| A2 | A0,A1,A3 |
| A3 | A0,A2, A3 |

Fig.16

| OUTPUT PORT NUMBER | #0 | #1 | #2 | #3 |
|---|---|---|---|---|
| COUNT | 4 | 1 | 4 | 3 |

Fig.17

| CLUSTER NUMBER | DESTINATION CLUSTER NUMBER |
|---|---|
| A0 | A3 |
| A1 | — |
| A2 | A0,A1 |
| A3 | A2 |

Fig.18

| OUTPUT PORT NUMBER | #0 | #1 | #2 | #3 |
|---|---|---|---|---|
| COUNT | 3 | 0 | 3 | 3 |

MULTI-PROCESSOR SYSTEM APPARATUS ALLOWING A COMPILER TO CONDUCT A STATIC SCHEDULING PROCESS OVER A LARGE SCALE SYSTEM OF PROCESSORS AND MEMORY MODULES

This application is based on the application No. 2001-056475 filed in Japan, the contents of which are hereby incorporated by reference.

BACKGROUND OF THE INVENTION

1. Field of the Invention

The present invention relates to a multi-processor system apparatus using two or more processors and particularly to a multi-processor system apparatus which has groups of processor and memory modules interconnected with multiple stages of switching (i.e. a multi-stage interconnection network).

2. Description of the Prior Art

A multi-processor system apparatus having groups of processor and memory modules interconnected by switching elements may take a more duration of time for data processing when two or more data packets are received by a single switching element causing collision of data, thus declining the efficiency of the data processing. For compensation, some schemes including non-blocking network, re-arrangeable network, and blocking network have been suggested for minimizing the event of packet data collision in a switch.

The non-blocking network such as crossbar network or Clos network may avoid any collision of data in a switch when the concentration of call lines is inhibited by scheduling. Also, the re-arrangeable network may allow no collision when the setting of switching elements is controlled by scheduling. Whereas, the blocking network may generally eliminate any collision with not simply scheduling but scheduling of a pattern of access demands.

However, the non-blocking network becomes large in the hardware arrangement to meet the number of processor and memory modules and will be increased in the cost of large-scale system production. Although its hardware cost is smaller than the non-blocking network, the re-arrangeable network requires more time for the scheduling and will hardly be compatible with a multi-processor system. Additionally, as the scheduling process of the blocking network generally allow no collision through re-arranging patterns of access demands, its practical action on the multi-processor system is limited to only a particular case where demanding factors are aligned in a given order.

SUMMARY OF THE INVENTION

The present invention has been developed for solving the foregoing problems and its object is to obtain a multi-processor system apparatus which allows a compiler to easily conduct a static scheduling process over a large scale system of processor and memory modules and can perform the transfer of data packets without collision of data in response to a common pattern of simultaneous access demands.

A multi-processor system apparatus according to the present invention having two or more processors connected to each other by a network arrangement includes a multiplicity of processor elements (processing elements) and an interface for connection with the network arrangement. Each processor element includes a processor, a memory and an interface for connection with the network arrangement. On the other hand, the multi-stage interconnection networks have a multiple stage connection arrangement where multiple stages of switching elements are provided for interconnection between the processor elements. The processor elements and the multi-stage interconnection networks are grouped to clusters based on a specific number and arranged in multiple levels. The transfer of data packets between the processor elements is conducted according to a schedule statically determined with the use of switching state tables. The table is generated at different timings and indicates the status of the switching elements in the multi-stage interconnection networks. This construction allows the multi-processor system apparatus to perform non-synchronous execution. As a result, the hardware required for synchronization can be reduced in the overhead and its parallel operation will be improved in the efficiency.

The multi-stage interconnection networks of a multiple stage connection arrangement may be classified into the following two functions. That is, one is an upstream linking network for upward transfer of data packets from the lower stage to the upper stage. The other is a downstream linking network for downward transfer of data packets from the upper stage to the lower stage. In that case, the packets can be inhibited from gathering in a particular network of the exchanger for connection between clos networks and generating any hot spot, hence contributing to the improvement of the multi-processor system apparatus performance.

More specifically, the switching status table may include data of a packet assigned to a particular output port, data of other packets demanding the connection to the output port, and data of the status of the output port of each switching element. In that case, it allows the static scheduling to be easily carried out in the large scale arrangement including the processor elements and the multi-stage interconnection networks.

It may be modified in which when the connection to the output port of a switching element is demanded by two or more packets at the same timing, the transfer of packets between the processor elements is conducted as scheduled across the multi-stage interconnection networks. So, a packet not assigned to the output port through a specific manner of arbitration is permitted to demand the output port with a switching status table at another timing. In that case, the transfer of packets can be conducted without collision of data in response to a common pattern of simultaneous access demands.

Whereas, it may also be modified in which the multi-stage interconnection networks are of clos network and when the connection to the output port of a switching element is demanded by two or more packets at the same timing, the transfer of packets between the processor elements is conducted as scheduled across the multi-stage interconnection networks. So, a packet not assigned to the output port through a specific manner of arbitration is permitted to demand another output port which is not demanded by other packets. In that case, it can increase the efficiency of the transfer of data packets, hence contributing to the improvement of the multi-processor system apparatus performance.

More specifically, the scheduling for each packet may preliminarily be conducted by a compiler. In that case, the scheduling of packets which is dynamically conducted at the event of collision in the prior art can be controlled by the compiling process. Also, the hardware arrangement, such as an FIFO module, which is substantially required for the dynamic scheduling of packets can significantly be reduced in the size. Moreover, the network environment for non-synchronous executions between the processors can favorably be established.

BRIEF DESCRIPTION OF THE DRAWINGS

Various characteristics and advantages of the present invention will become clear from the following description taken in conjunction with the preferred embodiments with reference to the accompanying drawings throughout which like parts are designated by like reference numerals, in which:

FIG. 7 is a diagram of a switching status table;

FIG. 11 is a diagram of a switching status table prior to arbitration;

FIG. 12 is a diagram of the switching status table after the arbitration;

FIG. 15 is a diagram showing an initial state of the access list ALcur;

FIG. 16 is a diagram showing an initial state of the valid port counter VPC;

FIG. 17 is a diagram showing a state of the access list ALnew after each packet is assigned;

FIG. 18 is a diagram showing a state of the valid port counter VPC after each packet is assigned;

DETAILED DESCRIPTION OF THE PREFERRED EMBODIMENTS

Next, the present invention will be described in more detail referring to some embodiments illustrated in the relevant drawings.

First Embodiment

Figure 1:
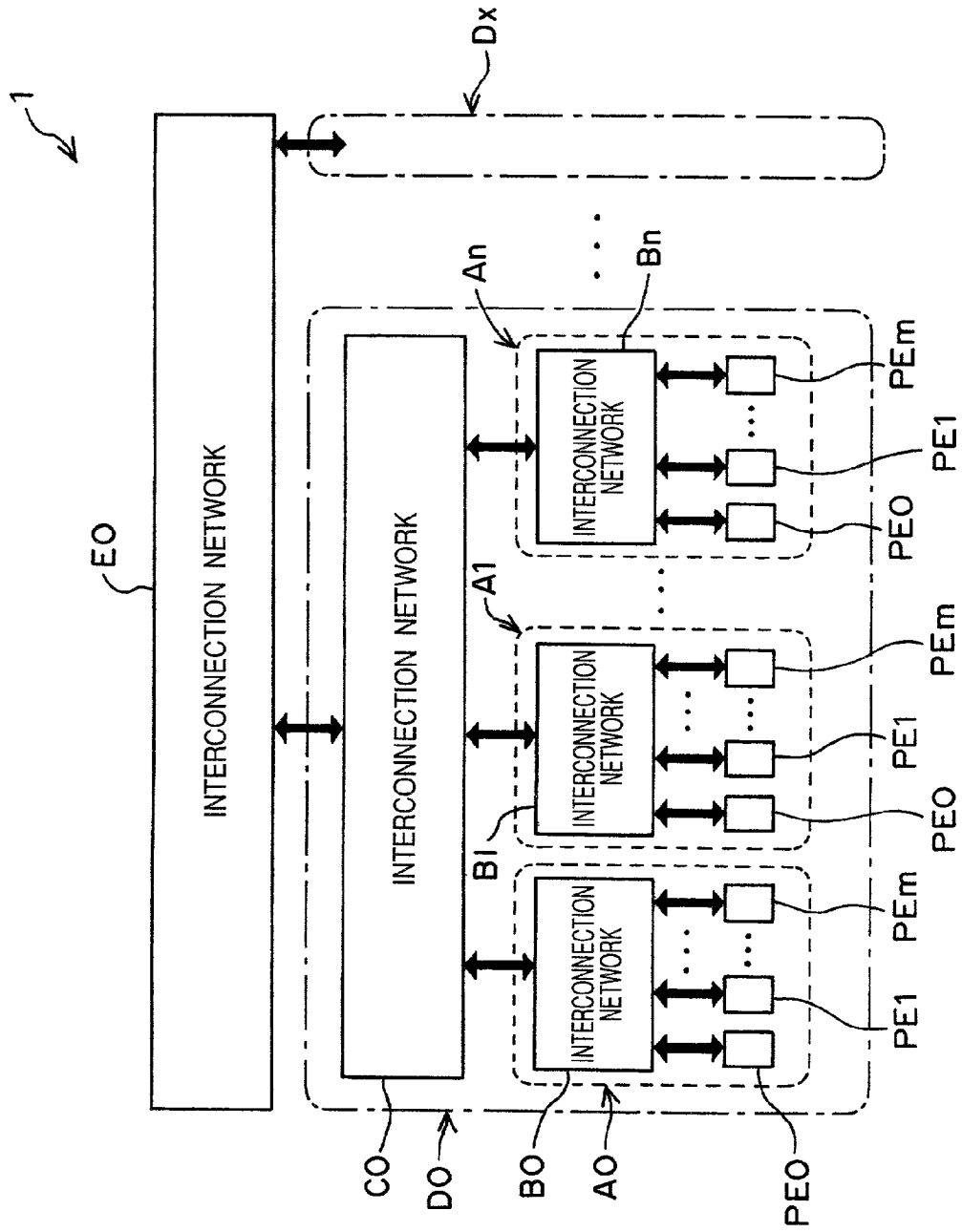
FIG. 1 is a schematic block diagram of a multi-processor system apparatus showing the first embodiment of the present invention.

FIG. 1 is a schematic block diagram of a multi-processor system apparatus showing the first embodiment of the present invention.

As shown in FIG. 1, the multi-processor system apparatus 1 has some tens to thousands of processor elements PE interconnected by a multi-stage interconnection network (MIN) having multiple stages. The multi-stage interconnection network shown in FIG. 1 includes three layers.

The multi-processor system apparatus 1 includes a group of clusters D0 to Dx (x being an integer, X>0) and an interconnection network E0 for connecting between the clusters D0 to Dx. Each of the clusters D0 to Dx includes clusters A0 to An (n being an integer, n>0) and an interconnection network, one of C0 to Cx, for connecting between the clusters A0 to An. Similarly, each of the clusters A0 to An includes processor elements PE0 to PEm (m being an integer, m>0) and an interconnection network, one of B0 to Bn, for connecting between the processor elements PE0 to PEm.

Therefore, the multi-processor system apparatus 1 has some hundreds to thousands of processor elements PE interconnected by a multi-stage interconnection network which has multiple stages of switching, each switching stage being favorably designed for connecting between a few to some tens of the processor elements PE as a middle-sized system apparatus. The target processor element PE can be accessed through switching the route at each stage.

As the processor elements PE0 to PEm are identical in the construction, their representative PEi (i=0 to m) will now be explained.

Figure 2:
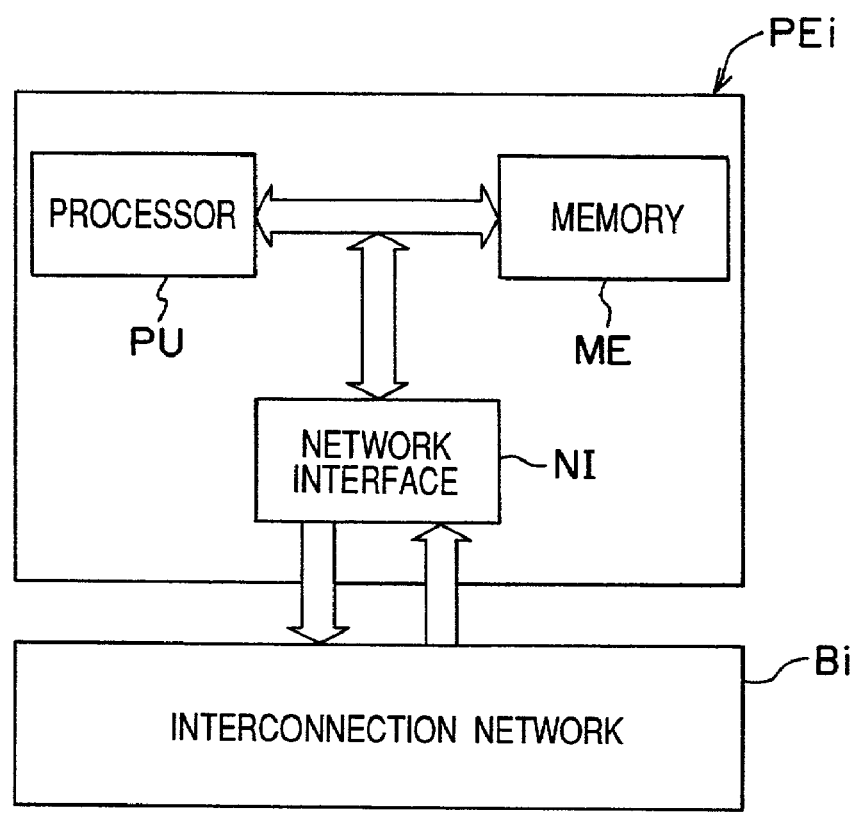
FIG. 2 is a schematic block diagram of an exemplary arrangement of the processor element.

FIG. 2 is a schematic block diagram showing an arrangement of the processor element PEi.

As shown in FIG. 2, the processor element PEi includes a processor PU. a memory ME, and a network interface NI. The processor PU and the memory ME are connected to each other and further to an interconnection network Bi by the network interface NI.

In this construction it is now assumed that the connection between the processor elements in each of the clusters A0 to An is designated as Level 0, the connection between the clusters A0 to An as Level 1, and the connection between the clusters D0 to Dx as Level 2. Therefore the clusters A0 to An operate at Level 0, the clusters D0 to Dx operate at Level 1, and the interconnection network E0 operates at Level 2, thus constituting a three-levels interconnection arrangement from Level 0 to Level 3. In other words, the clusters D0 to Dx and the interconnection network E0 are grouped to a cluster F0 which is operated at Level 2.

Figure 3:
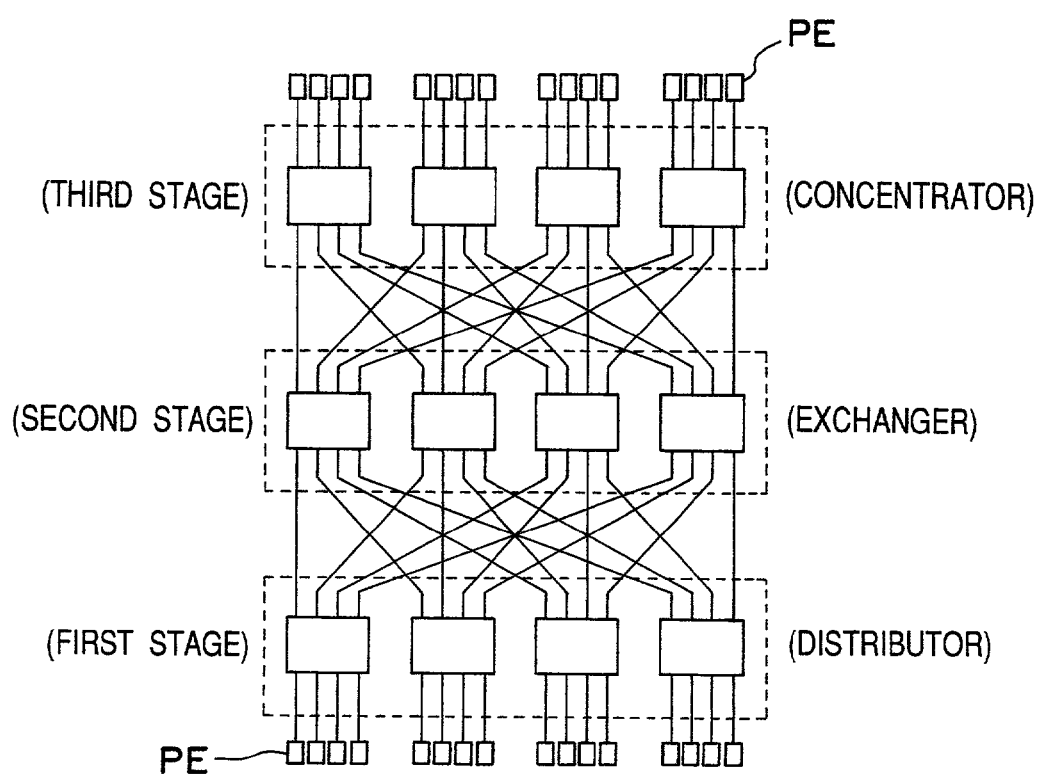
FIG. 3 is a diagram showing clos network.

FIG. 3 illustrates clos network as one common example of the multi-stage interconnection network.

Clos network includes three switching stages having a distributor as the first stage, an exchanger as the second stage, and a concentrator as the third stage. As each stage shown in FIG. 3 includes four switches, the switch has four input ports and four output ports.

The number of nodes in the multi-stage interconnection network or the number of stages for determining the route to each of the processor elements PE is expressed by $\log_k(m+1)$ where (m+1) is the number of processor elements PE and k is the number of input or output ports of the switch. As the same processor elements PE are illustrated at opposite ends, the arrangement shown in FIG. 3 involves m+1=16 and k=4.

Although the route to the processor elements PE may be determined by latest two stages of switching, clos network includes three stages of switching for increasing the amount of data to be transferred and providing a redundancy of the routes. Therefore, each processor element PE is connected at one end to one input port of the switch in the distributor and at the other end to one output port of the switch in the concentrator.

The multi-stage interconnection network is capable of operating at three different modes depending on the number of input or output ports of each switch and the total number of the switches; non-blocking mode, re-arrangeable mode, and blocking mode. The non-blocking mode is able to statically determine a route which generates no collision of the data to be transferred while the re-arrangeable mode can select another route when collision of the data occurs on the pre-selected route. The blocking mode is not able to select no collision avoidable route when collision of the data occurs on the pre-selected route. For example, assuming that the number of the input or output ports of each switch and the number of the switches at the intermediate stage is p in clos network shown in FIG. 3, the operation mode is the non-blocking mode when $p > (2k-1)$, the re-arrangeable mode when $p \geq k$, and the blocking mode when $p < k$.

Whereas, it is not practical in the form of a hardware arrangement to connect some hundreds to thousands of the processor elements PE by a single multi-stage interconnection network. For compensation, a several number of the processor elements PE are connected to a crossbar switching arrangement thus forming a network at Level 0. Then, a more number, a dozen to tens, of the processor elements PE are connected with a higher level of switching arrangement of which the inputs are connected to the crossbar switching arrangements, forming a network at Level 1. In addition, the higher level switching arrangements networks are connected with an extensions stage which comprises a group of switches, thus forming a network at Level 2.

Similarly, when a desired number of the system apparatuses are linked to each other by adding extra higher level stages, a resultant multi-level structure based on the multi-stage interconnection networks can be developed thus increasing the scalability of data exchange. As the network at each stage is substantially considered as a sub network, it is then referred to as a Level s network NWs (s being an integer, s>0) hereinafter.

An network arrangement based on the multi-stage interconnection networks of a cross connection type will now be explained.

Figure 4:
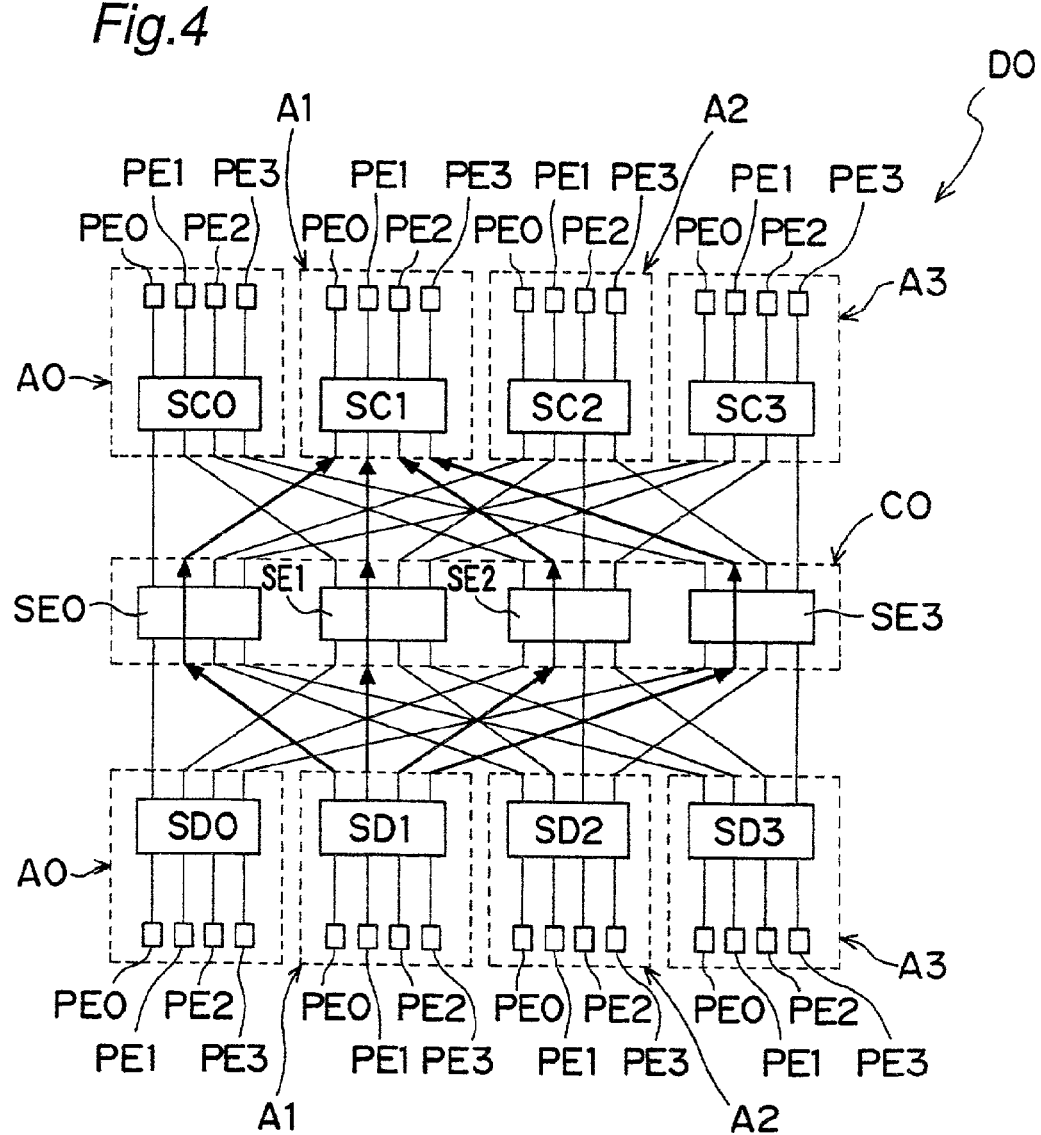
FIG. 4 is a diagram showing a network arrangement at Level 0 in clos network.
Figure 5:
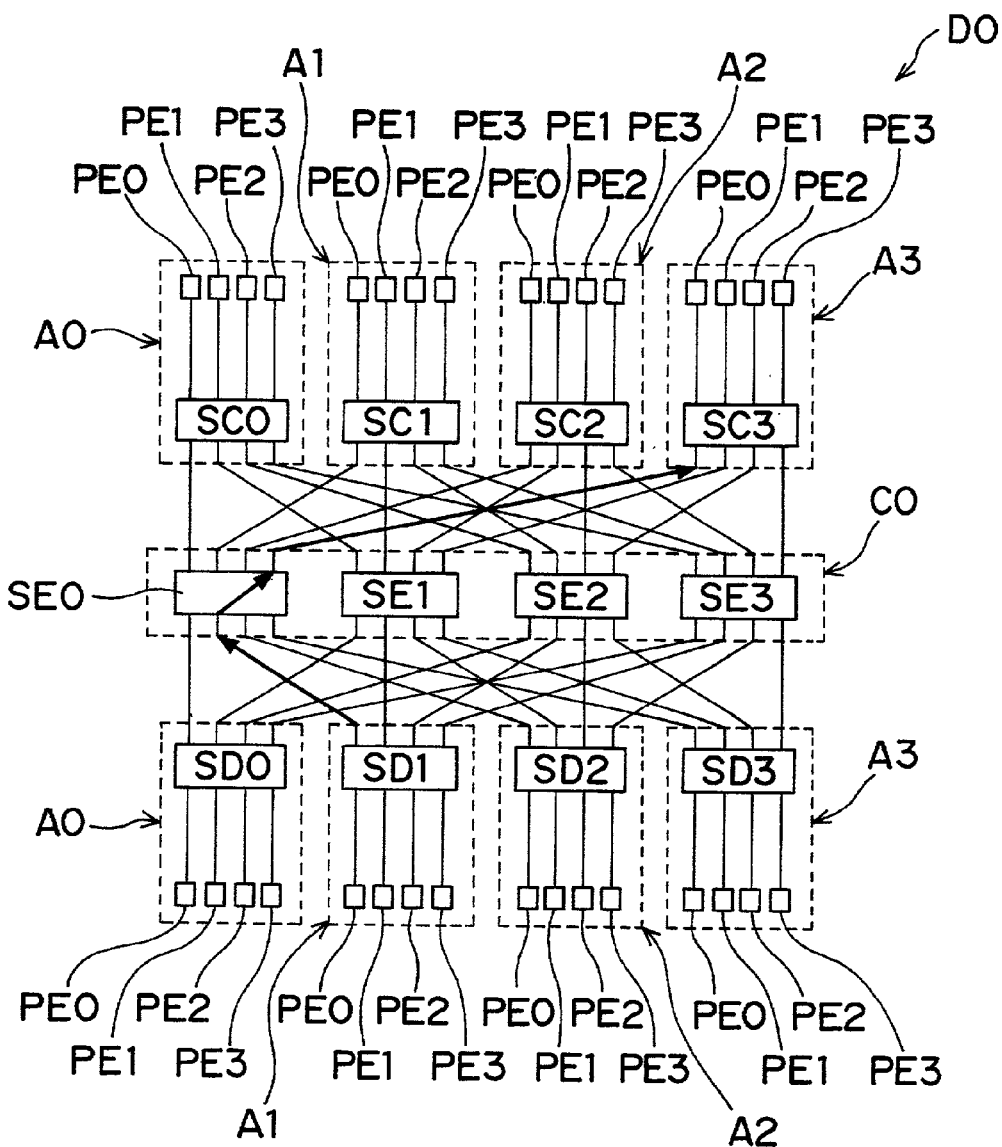
FIG. 5 is a diagram showing a network arrangement at Level 1 in clos network.

FIGS. 4 and 5 are diagrams showing sub networks in clos network of the basic arrangement. FIG. 4 illustrates a Level 0 network in clos network. FIG. 5 illustrates a Level 1 network in clos network. The arrangement shown in each of FIGS. 4 and 5 includes four of the clusters A0 to A3, each cluster having four processor elements PE0 to PE3.

As shown in FIGS. 4 and 5, there are provided a group of switching elements SD0 to SD3 acting as the distributor, another group of switching elements SE0 to SE3 acting as the exchanger, and a further group of switching elements SC0 to SC3 acting as the concentrator in clos network. Each of the switching elements SD0 to SD3, SE0 to SE3, and SC0 to SC3 has input ports and four output ports.

The switching elements SD0 and SC0 with their respective sets of the four processor elements PE0 to PE3 are grouped to a cluster A0. Equally, the switching elements SD1 and SC1 with their respective sets of the processor elements PE0 to PE3 are grouped to a cluster A1, the switching elements SD2 and SC2 with their respective sets of the processor elements PE0 to PE3 are grouped to a cluster A2, and the switching elements SD3 and SC3 with their respective sets of the four processor elements PE0 to PE3 are grouped to a cluster A3.

When the switching elements SE0 to SE3 for the interconnection network C0 are actuated for straight connecting one input port to its corresponding output port as denoted by the arrow in FIG. 4, the Level 0 network is implemented for transfer of data within each of the clusters A0 to A3. Alternatively, the switching elements SE0 to SE3 in the exchanger for the interconnection network C0 at the second stage are actuated for exchange connecting the input port to another output port as denoted by the arrow in FIG. 5, the Level 1 network is implemented for transfer of data between the clusters A0 to A3.

When the switching elements SE0 to SE3 in the exchanger at the second stage conduct a switching action, they establish a Level 1 network. When not, they establish a Level 0 network. Therefore, clos network includes Both the Level 0 network and the Level 1 network as two sub networks.

The higher level interconnection network E0 shown in FIG. 1 for connecting between clos networks will now be explained.

Figure 6:
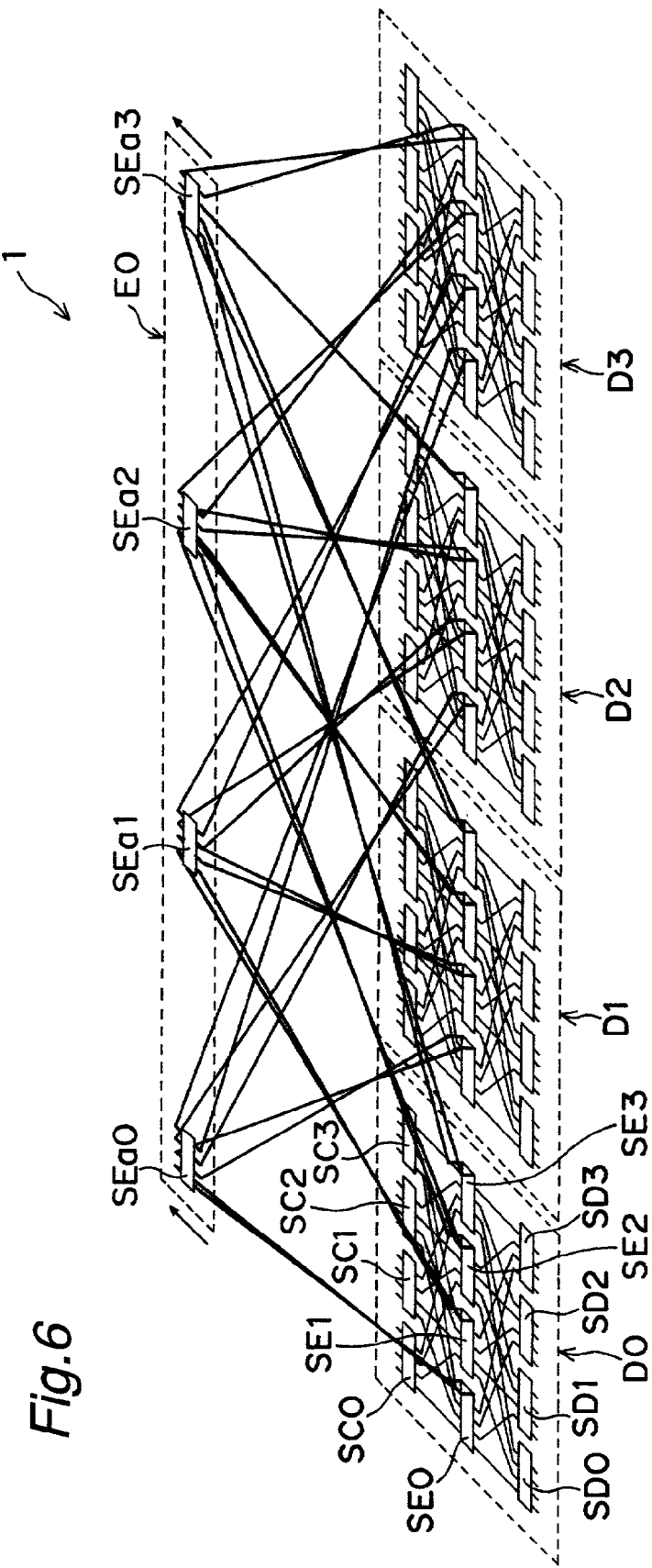
FIG. 6 is a view showing a multiple stage clustering arrangement of the multi-processor system apparatus.

FIG. 6 illustrates an arrangement of the multi-processor system apparatus 1 with a multi-stage clustering structure. The multi-stage clustering structure shown in FIG. 6 includes four clusters D0 to D3, each cluster consisting of four clusters A0 to A3 and each sub cluster having four processor elements PE0 to PE3 which are not shown for simplicity of the explanation.

As each of the clusters D0 to D3 shown in FIG. 6 has sixteen processor elements interconnected with clos network, the clusters D0 to D3 with clos networks are interconnected by a group of switching elements SEa0 to SEa3 in the exchanger at the higher stage or Level 2. The switching elements SEa0 to SEa3, each having four input ports and four output ports, constitute an interconnection network E0 such as shown in FIG. 1. Also, in this case each of the switching elements SE0 to SE3 of each clos network at the lower stage is equipped with a pair of extra input and output ports, thus having five input ports and five output ports.

Also, in case that a more number of the processor elements are to be connected, a higher stage or Level 3 network may be added as the exchanger for connecting between the Level 2 networks. Therefore, two or more of the system arrangements shown in FIG. 1 are provided as interconnected by an extra interconnection network, hence developing a four-layers structure. When the number of layers is R, the number N of the processor elements to be interconnected is calculated from the following equation (1).

$$N = (m+1) \times k^{(R-1)} \tag{1}$$

where (m+1) is the number of the processor elements in the basic multi-stage interconnection network.

As the multi-processor system apparatus 1 shown in FIG. 1 exhibits $m+1 = k \times k$, Equation (1) is expressed as $$N = k \times k \times k^{(R-1)} = k^{(R+1)} \tag{2}$$

Next, a static scheduling method for the multi-stage interconnection network of the above arrangement will be described.

It is now assumed as premises for the static scheduling that the transfer of every data is statically analyzed completely by a scheduler provided in a compiler and the access to the data is scheduled with all information about the transfer of every data in packets at a given timing having been given.

It is essential for carrying out the static scheduling to acknowledge the status of each switching element. So, a switching status table for each output port of the switching element is prepared including the classifications such as "current time", "hold port", "hold clock", "port demand waiting queue", and "status". The "hold port" indicates an input port number which holds the output port. The "hold clock" is the number of (clock) cycles held by the port. The "port demand waiting queue" is a waiting queue for inserting the input port number which is demanded by the output port. The "status" is the status of the output port selecting from "Released" and "Hold".

FIG. 7 illustrates an example of the switching status table. The switching element shown in FIG. 7 has four input ports and four output ports.

Shown in FIG. 7 is the switching element at the current time of 157843 and with the output port #0 held for two clocks by the input port #3. Thus, this allows the output port #0 to be accessed by no other input port for transfer of packets during the period of two clocks. As the output port #1 is free, its connection for packet transfer is demanded from two input ports #0 and #2. As the output ports #2 and #3 are free, the connection to the output #2 is demanded by a packet at the input port #1.

The switching status tables of each switching element shown in FIG. 7 are provided and used by the scheduler in the compiler for scheduling. If the port demand waiting queue contains two or more demands such as at the output port #1 shown in FIG. 7, the priority of each packet is examined by arbitration and the demand from a packet lost in the arbitration will be accepted later.

Whereas the packet won priority upon being allowed to connect to the output port is listed in the hold port and the hold clock in the switching status table of the output port and held until the hold clock counts one. Accordingly, the switching status table may be needed for each access time. However, as the switching status table required for scheduling the access from a packet at a given time dose not precede the given time, any other tables preceding the given time can be discarded.

A static scheduling procedure conducted by the compiler using the switching status tables will be explained. It is assumed that a group of packets Uts issued at the time Ts are Uts=p0, p1, . . . , pN. The static scheduling procedure is carried out by the compiler unless otherwise specified.

The procedure starts with producing the switching status tables of a switching element in the distributor for each packet pj (j=0 to N) of the group corresponding to the data of a header (such as a routing tag) of the packet. The current time in the switching status table is set to Ts. As the switching status tables of the switching element in the distributor for the packets p1 to pN are completed, the priority of the packets in a port demand waiting queue received at the input ports is determined by the arbitration. Each packet lost in the arbitration are separated from the current packet group Uts and inserted into the succeeding group of packets Uts+1 issued at the time Ts+1.

Whereas the packets won priority in the arbitration are assigned to the output ports of which the switching status tables are generated or rewritten by a number determined by the hold clock cycles. When the status of the output ports of each switching element is determined, the switching status tables of each switching element at the succeeding stage are generated or rewritten. The switching status tables indicate the status of the switching element when the current time is advanced by one.

As those steps are repeated, the packets received at the destination are removed from the packet group Uts at a time. The action is repeated until the packet group Uts will be exhausted.

The packet issued at the time Ts is adjusted or scheduled for creating no collision. Also, when two of the packets released at once from one node are conveyed in the packet group, one of them is transferred into the succeeding packet group. Accordingly, as the access by packets is highly intensified, the packet groups will be shifted back one after another. Because the same scheduling procedure as at the time Ts is performed for each timing, the transfer of packets can statically be scheduled.

Figure 8:
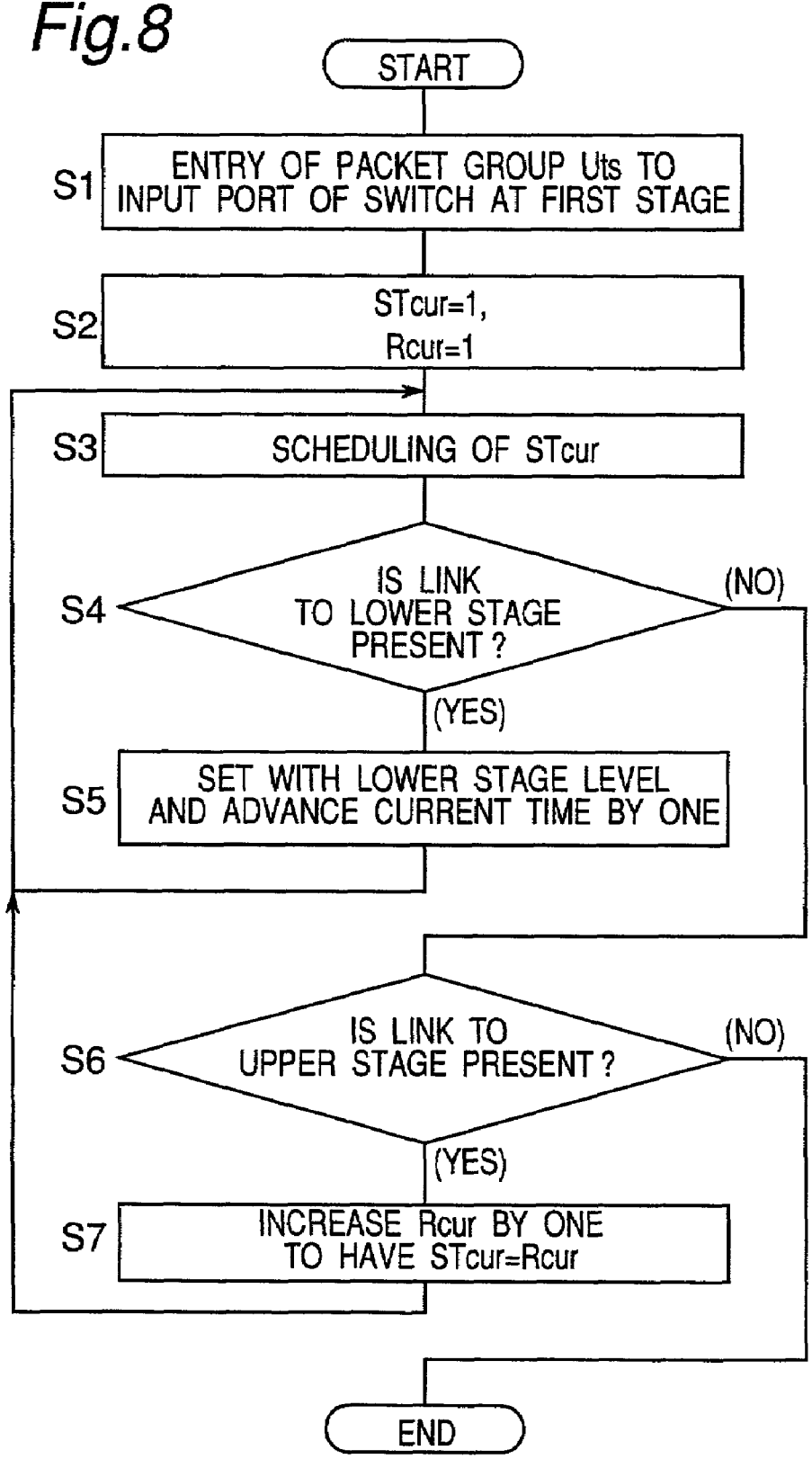
FIG. 8 is a flowchart of a static scheduling procedure using the switching status table.
Figure 9:
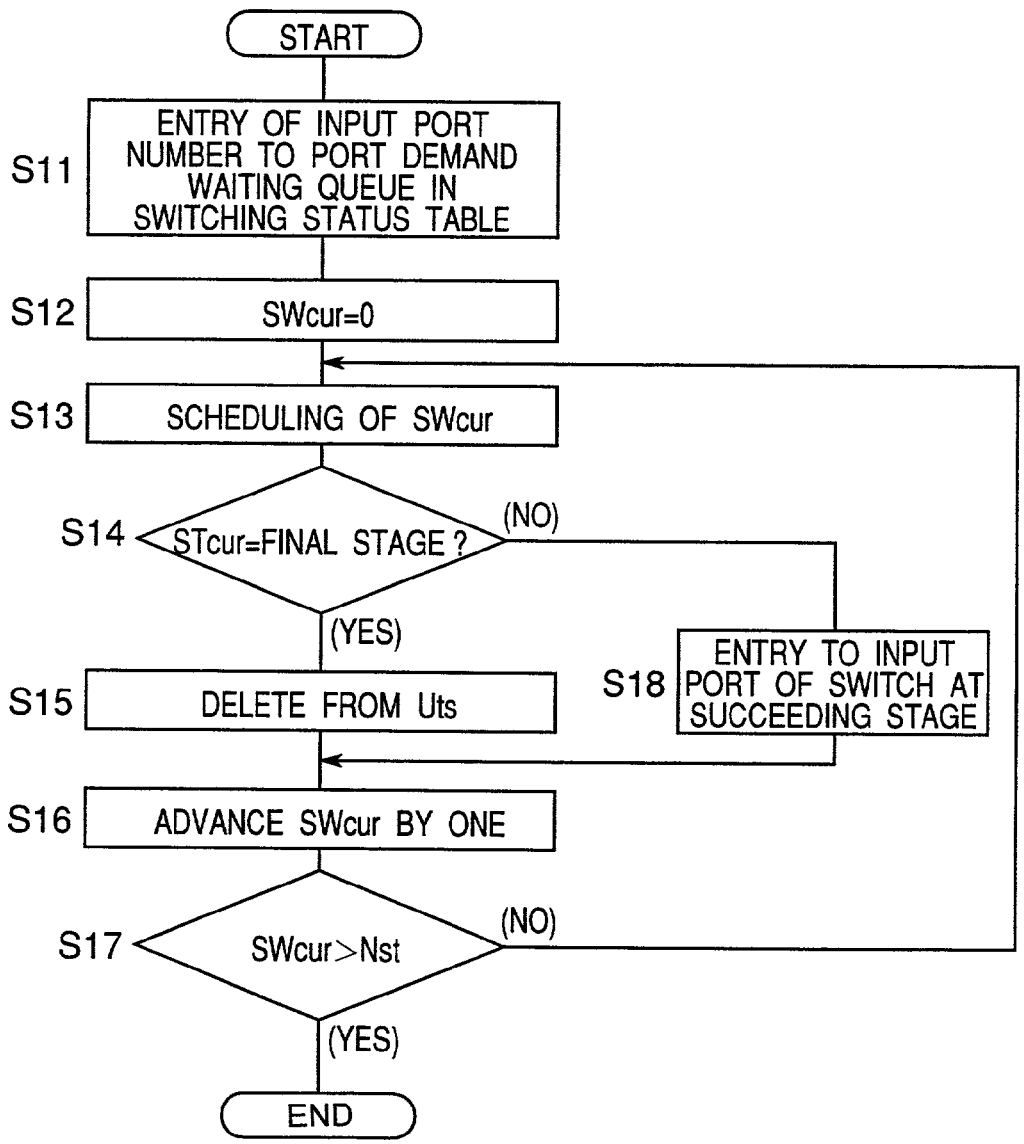
FIG. 9 is a flowchart of the static scheduling procedure using the switching status table.
Figure 10:
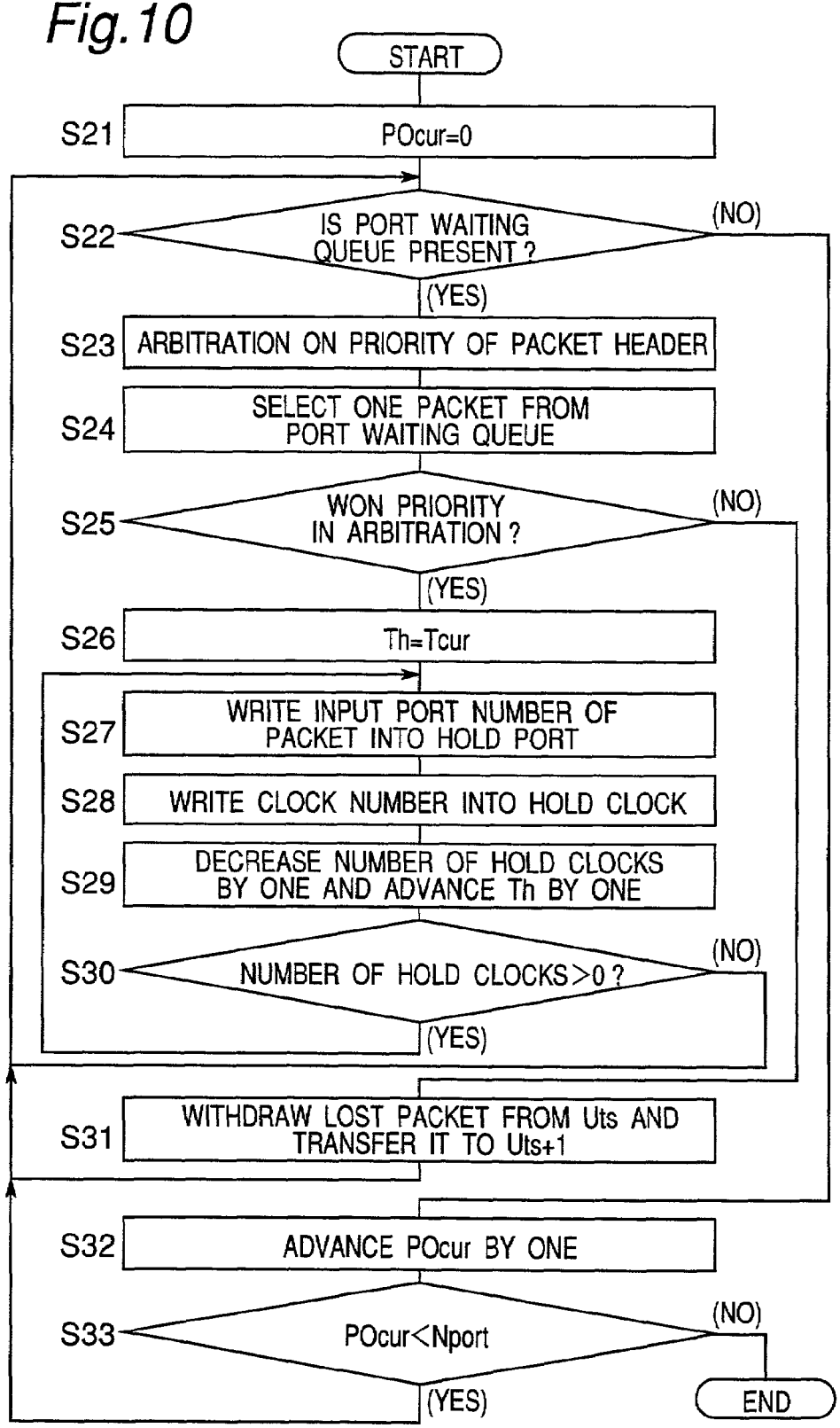
FIG. 10 is a flowchart of the static scheduling procedure using the switching status table.

FIGS. 8 to 10 are flowcharts showing the procedure of static scheduling with the switching status tables. The static scheduling procedure will be described in more detail referring to the flowcharts of FIGS. 8 to 10. It is also assumed throughout FIGS. 8 to 10 that a group of packets Uts issued at the time Ts are Uts=p0, p1, . . . , pN. The static scheduling procedure shown in FIGS. 8 to 10 is carried out by the compiler unless otherwise specified.

As shown in FIG. 8, a packet group Uts issued at the time Ts is received by the input ports of each switching element at the first stage (Step S1). The stages of the multi-stage interconnection network are numbered incrementally from 1 at the entry stage. The current switching stage STcur is set to 1 and the highest stage Rcur involved currently is also set to 1 (Step S2). Then, each switching element in the current stage STcur is scheduled (Step S3). It is examined whether or not the switching element in the current stage STcur has any linkage to the lower stage (Step S4). When so (YES), the current stage STcur is shifted down to a lower level and the current time Tcur is advanced by one (Step S5). Then, the procedure returns back to Step S3.

When no linkage to the lower stage is found at Step S4 (NO), the switching element in the current stage STcur is examined whether or not it has a linkage to the upper stage (Step S6). When so (YES), the setting of the highest stage Rcur is incremented by one and the current switching stage STcur is set to the level equal to Rcur (Step S7). Then, the procedure returns back to Step S3. When it is determined at Step S6 that no linkage to the upper stage is found (NO), the procedure is terminated.

The action of Step S3 shown in FIG. 8 will now be described in more detail referring to the flowchart of FIG. 9.

As shown in FIG. 9, the port demand waiting queue in the switching status table at the current time Tcur of each switching element in the current stage STcurr is assigned with the number of each input port, at which a packet is received, in response to the number of the output port to be demanded (Step S11). Then, the switching elements in the current stage STcur are numbered from 0 and the number of the switching element SWcur involved is set to 0 (Step S12).

The switching element SWcur is subjected to scheduling with the switching status tables (Step S13). It is examined whether the current switching stage STcur is the highest level or not (Step S14). When it is judged at Step S14 that the stage STcur is the highest (Yes), the packet designated to the output port is removed from the current packet group Uts (Step S15). Then, the switching element number SWcur is incremented by one (Step S16) and it is examined whether or not the switching element number SWcur is bigger than the total number of the switching elements Nst of the current switching stage ST cur (Step S17).

When it is judged at Step S17 that the number SWcur is bigger than Nst (Yes), this routine is terminated and the procedure goes to Step S4 of FIG. 8. When it is judged at Step S17 that the number SWcur is not bigger than Nst (No), the procedure returns back to Step S13. When it is judged at Step S14 that the current stage is not the highest (No), the packet received at the output port is transmitted to the corresponding input port of a switching element in the succeeding stage (Step S18) and the procedure goes to Step S16.

The scheduling action at Step S13 shown in FIG. 9 will be described in more detail referring to the flowchart of FIG. 10.

As shown in FIG. 10, the number of the output port POcur determined by the switching status table is set to 0 (Step S21) and it is examined whether or not the output port number POcur has a port demand waiting queue (Step S22). When it is judged at Step S22 that the port demand waiting queue exists (Yes), the priority is examined from the header of each packet by the arbitration (Step S23) and the packets are extracted one by one from the port demand waiting queue (Step S24). It is then examined whether the packet extracted is won priority in the arbitration or not (Step S25).

When it is judged at Step S25 that the packet extracted is the highest (Yes), the time Th in the switching status table of the packet is set to Tcur (Step S26). The number of the input port at which the packet is received is set in the hold port of the output port number determined by the switching status table at the time Th (Step S27). Also, the hold clock is assigned with the number of clocks required for transferring the packet (Step S28). The number of clocks written in the hold clock is decreased by one and the current time Th is advanced by one (Step S29). It is then examined whether the number of clocks in the hold clock is zero or not (Step S30). When it is judged at Step S30 that the number of clocks is not zero (Yes), the procedure goes back to Step S27. When zero (No), the procedure returns back to Step S22.

When it is judged at Step S25 that the packet picked up is lost in the arbitration (No), the packet is removed from the current packet group Uts and transferred to the succeeding packet group Uts+1. The packet groups are shifted back by one until two or more packets are not issued from one node simultaneously (Step S31) and the procedure moves back to Step S22. When it is judged at Step S22 that no port demand waiting queue is found (No), the number of the output port POcur is advanced by one (Step S32). It is then examined whether or not the output port number POcur is smaller than the total number of the switching elements Nport (Step S33). When it is judged at Step S33 that the number POcur is smaller than Nport (Yes), the procedure returns back to Step S22. When not, this routine is terminated and the procedure goes to Step S14 of FIG. 9.

The scheduling procedure will be explained referring to a practical example. For example, it is assumed that the scheduling of packets issued at the time Ts is carried out with the status of a switching element in the stage network at the time 15000 shown in FIG. 11. FIG. 11 illustrates the switching element in the exchanger having five input ports and five output ports.

As shown in FIG. 11, the output port #2 is held two clocks by the input port #4. The packet received is assigned to the port demand waiting queue of a corresponding output port determined from its routing tag data. The switching status table shown in FIG. 11 indicates a status before the scheduling starts. The compiler conducts an arbitration process from the data listed in the switching status table of FIG. 11 and generates a switching status table shown in FIG. 12.

In FIG. 11, two input packets demand the connection to the output port #1 and their priority is examined from the header data by the compiler. When the packet received at the input port #1 has priority over the other, the compiler removes the other packet received at the input port #0 from the packet group Uts at the time Ts and transfers it to the succeeding packet group Uts+1. Accordingly, the packet received at the input port #0 is canceled from the access to the output port #1 as shown in FIG. 12. While the hold port of the output port #1 is assigned with the packet received at the input port #1 and given priority by the compiler, the hold clock of the output port #1 is set to 1 as shown in FIG. 12. Then, the output port #1 is turned to the hold state.

The output port #2 remains at its hold state and is held two clocks by the packet at the input port #4, as shown in FIG. 11. This causes the packet at the input port #3 which demands the connection to the output port #2 to be removed together with the other packets lost in the arbitration from the packet group Uts by the action of the compiler, transferred to the succeeding packet group Uts+1, and canceled from the access to the output port #2 as shown in FIG. 12. The output port #4 remains at its release state and is accessed by not other than the packet received at the input port #2, as shown in FIG. 11. This allows the compiler to transfer the packet from the input port #2 to the hold port at the output port #4 and write 1 into the hold clock at the output port #4. The output port #4 is turned to the hold state.

As the switching status table shown in FIG. 12 is developed with the completion of examining the priority by arbitration, the current time is advanced by one and the packet allowed to access the output port is sent to the input port of the switching element which is connected to the output port. The packet at the output port #4 is then transferred to the input port of a switching element at the higher stage. The packet received is registered to the port demand waiting queue by the action of the compiler and the process for examining the priority and assigning the output port is then followed. This is repeated until the packet is received at the destination. It is understood that the present invention is not limited to clos network of the multi-stage interconnection network from which the above embodiment is described and may equally be implemented with the use of any other known network arrangements including omega, baseline, delta, and generalized cube network constructions.

The scheduling procedure allows the packet lost in the arbitration to be transferred to the succeeding packet group. Alternatively, when the transfer of a packet is desired within clos network, the scheduling of a switching element in the exchanger at Level 1 may be followed by allowing a packet lost in the arbitration to be transferred through the free port of another switching element in the same exchanger at Level 1. This scheduling procedure will now be explained in more detail referring to clos network of the cluster D0 shown in FIG. 13.

Since the route to a destination in clos network is substantially determined by a combination of the exchanger at the second stage and the concentrator at the third stage due to the character of clos network, the output from the distributor at the first stage may arbitrarily be released. The transfer characteristic of clos network largely depends on the quality of the scheduling action of the exchanger at the second stage. The transfer of packets to the output port is determined by the scheduling action of the exchanger at the second stage. Accordingly, the scheduling action of the exchanger at the second stage is followed by the scheduling action of the distributor at the first stage.

As the scheduling action of the exchanger at the second stage significantly determines the transfer characteristic of clos network, it is an important factor. For conducting the scheduling action of the exchanger at the second stage at higher efficiency, it is a good idea to use cluster specified access lists AL and cluster specified varid port counters VPC instead of the switching status tables. The cluster specified access list (referred to as simply an access list hereinafter) AL carries a record that the packet from one of the clusters at Level 0 is transferred to another. The cluster specified varid port counter (referred to as varid port counter hereinafter) VPC indicates how many output ports are connected in each of the clusters at Level 0.

Figure 13:
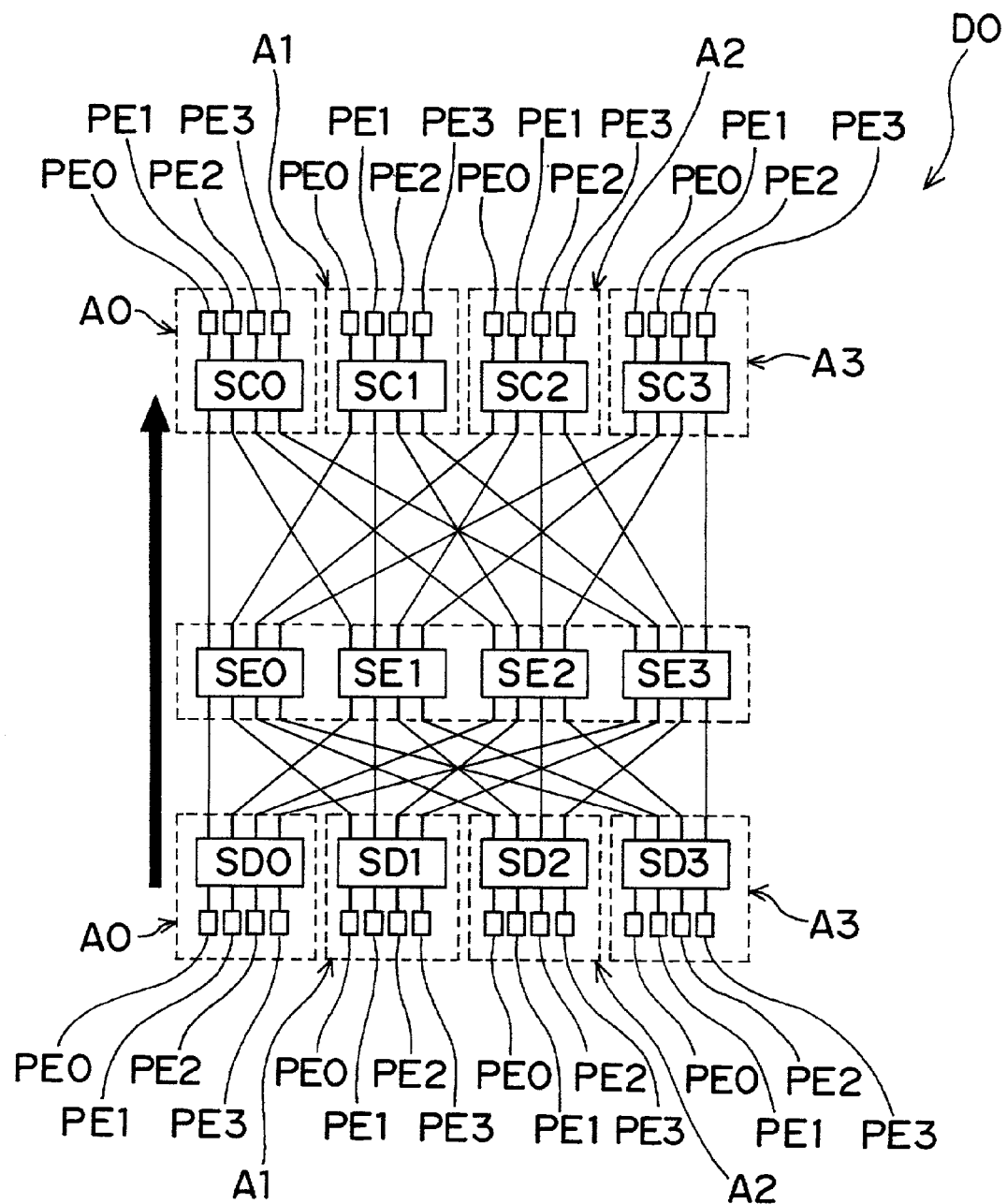
FIG. 13 is a diagram of another arrangement of clos network.

A procedure of the compiler generating the access list AL and the valid port counter VPC will now be explained referring to FIG. 13. FIG. 13 illustrates a clustering arrangement of the multi-stage interconnection network comprising four clusters D0 to D3, each cluster having four sub clusters A0 to A3 and each sub cluster having four processor elements PE0 to PE3 where the basic number is four. More particularly, the cluster D0 comprises four of the clusters A0 to A3 and switching elements SE0 to SE3. Each of the clusters A0 to A3 includes one of switching elements SD0 to SD3 and SC0 to SC3 and four of the processor elements PE0 to PE3.

The procedure of generating the access list AL will now be explained.

The compiler examines the header of each packet transferred from the switching element SD0 to the switching elements SE0 to SE3 and writes the cluster number of its destination into the access list AL. For example, when the packet received from the switching element SD0 has two cluster numbers A1 and A3 in the routing tag for the switching elements SE0 to SE3, the cluster A0 in the access list AL is written with A1 and A3.

Then, the procedure of generating the valid port counter VPC will be described.

Using the following equation (3), the compiler calculates from the access list AL counts CT0 to CT3 indicating how many valid output ports to be assigned to their corresponding clusters A0 to A3.

$$CTg=\text{(Number of switching elements at second stage)}-\text{(Number of factors which is equal to cluster specified number in cluster specified access list)} \quad (3)$$

where g ranges from 0 to 3.

For example, the count CT0 for the cluster A0 is CT0=4−2=2, if two packets from A0 are destined for A0.

A scheduling algorithm conducted by the compiler using the access lists AL and the valid port counters VPC will be explained. It is noted that the current access list is expressed by ALcur and the access list after the priority arbitration is denoted by ALnew.

The compiler assigns a series of packets from the least number of factors in the current access list ALcur of the cluster in the order of priority to the corresponding switching elements starting from SE0. Then, the compiler examines each factor (e.g. the cluster number of the destination) in the access list ALcur in the cluster and gives the factor, which indicates that the sender and the destination of a packet are registered in one cluster, the lowest of the priority. When not, for example, the cluster number of the destination is given priority from the least. Alternatively, the cluster number of the destination may be given priority from the largest.

When the valid port counter corresponding to the factor of the access list ALcur is zero, the scheduling action of the compiler is disabled. Then, the factor is removed from the packet group at the current time and joined to the succeeding packet group. When two or more packets demand the connection at the same time, the compiler examines the priority or performs a round-robin scheduling process. When the packet is won priority in the arbitration, it is withdrawn from the access list ALcur and the count in the corresponding valid port counter VPC indicating the number of valid ports is decremented by the compiler. Then, the compiler writes the input port number of the priority packet into the switching status table of the desired output port and marks an end-of-process check on the cluster connected.

The compiler removes the packet lost in the arbitration and the packet specifying the cluster of which the destination is equal to that of the packet given priority from the current access list ALcur and registers to the succeeding access list ALnew. Those actions of the compiler are repeated until all the clusters A0 to A3 in the access list ALcur are marked up with the end-of-process check. As the clusters A0 to A3 in the access list ALcur have been marked with the end-of-process check, the compiler transfers all the factors from the current access list ALcur to the succeeding access list ALnew and ALnew is redefined as a ALcur and ALnew is prepared as a empty list and clear all marks with the end-of-process check and repeats the same actions until the factors of each cluster in the access list ALcur are solved.

Figure 14:
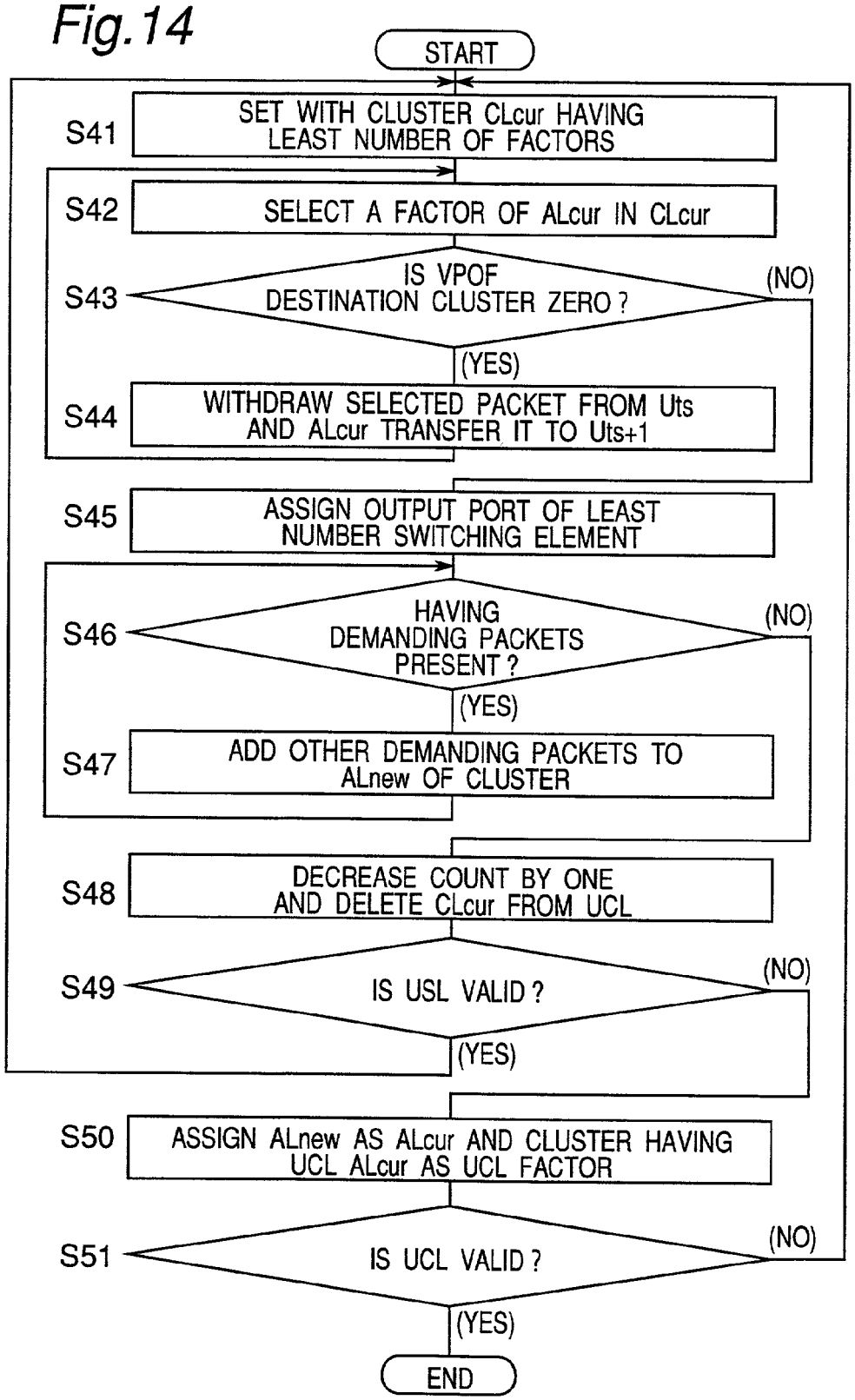
FIG. 14 is a flowchart of a scheduling procedure in clos network using an access list AL and a valid port counter VPC.

FIG. 14 is a flowchart showing the scheduling procedure in the clos network using the access lists AL and the valid port counters VPC. The scheduling procedure in clos network will now be described in more detail referring to FIG. 14. It is noted that each step of the procedure shown in FIG. 14 is conducted by the compiler unless otherwise specified.

The procedure of FIG. 14 starts with assigning the cluster number CLcur to a cluster, which has the least number of factors, of the cluster group UCL at Level 0 having the access lists AL not free in clos network (Step S41). When two or more clusters have the least number of factors, any of them may be selected and assigned with the cluster number CLcur.

Then, one of the packets of the factors in the access list ALcur of the cluster numbered by CLcur is selected (Step S42) and its destination cluster is examined whether the valid port counter VPC is zero or not (Step S43). When it is judged at Step S43 that the valid port counter VPC is zero (Yes), the packet selected is withdrawn from the packet group Uts and the access list ALcur and transferred to the succeeding packet group Uts+1. In succession, the packet issued after the time Ts is shifted to the following packet group until the overlap demand of packets is vanished (Step S44). Then, the procedure returns back to Step S42.

When it is judged at Step S43 that the valid port counter VPC is not zero (No), the packet selected is assigned to the output port of the switching element of the least number among the switching elements SE0 to SE3 having free output ports (Step S45). Then, the cluster group UCL is examined whether or not it contains a cluster having two or more packets competing with each other over the access list ALcur (Step S46). When a cluster having two or more packets competing with each other is found (Yes), the packets are transferred from the access list ALcur to the access list ALnew (Step S47). Then, the procedure moves back to Step S46.

When it is judged at Step S46 that any cluster having two or more packets competing with each other is not found (No), the count of the valid port counter VPC is decreased by one and the cluster number CLcur is deprived from the cluster group UCL (Step S48). It is then examined whether the cluster group UCL is invalid or not (Step S49). When so (Yes), the procedure returns back to Step S41. When it is judged at Step S49 that UCL is not invalid (No), all the packets are transferred from the access list ALcur to the access list ALnew which thus serves as ALcur and the cluster having an invalid access list is assigned as a factor of the cluster group UCL (Step S50). It is then examined whether the cluster group UCL is valid or not (Step S51). When so (Yes), this routine is terminated. If not (No), the procedure goes back to Step S41.

The action of the compiler will be explained in conjunction with an example. FIG. 15 illustrates an initial form of the access list ALcur. FIG. 16 illustrates an initial form of the valid port counter VPC. The example starts with the conditions shown in FIGS. 15 and 16.

The compiler selects a packet which is attributed to the cluster A1 having the least number of factors in the access list ALcur and destined to the cluster A2 and withdraws it from the access list ALcur. Then, the compiler assigns and records the output port #2 of the switching element SE0 of the exchanger at Level 1 onto the switching status table.

The compiler decreases by one the count of the output port #2 in the valid port counter VPC and marks the cluster A1 of the access list ALcur with an end-of-process check. The compiler removes the packet in the cluster A3 destined to the cluster A2 from the access list ALcur and loads the succeeding access list ALnew with the packet for reassignment.

Then, the compiler selects a packet which is attributed to the cluster A3 having the second least number of factors in the access list ALcur and destined to the cluster A0 and records it to the switching status table of the output port #0 of the switching element SE0. Then, the compiler decreases by one the count of the output port #0 in the valid port counter VPC and marks the cluster A3 of the access list ALcur with an end-of-process check.

Similarly, the compiler removes the packet in the cluster A2 destined to the cluster A0 from the access list ALcur and transfers it to the succeeding access list ALnew for re-transfer. At the time, the number of factors is two in either the cluster A0 or A2 and the compiler selects the cluster A0 to be processed first. The compiler selects and records a packet in the cluster A0 of the access list ALcur destined to the cluster A1 into the switching status table of the output port #1 of the switching element SE0. As a result, the packet is withdrawn from the access list ALcur.

The compiler decreases by one the count of the output port #1 in the valid port counter VPC and marks the cluster A0 of the access list ALcur with an end-of-process check. Then, when confirming that the count of the output port #1 in the valid port counter VPC is zero, the compiler withdraws the packet in the cluster A2 destined to the cluster A1 from the access list ALcur and transfers it to the succeeding packet group which issue the next clock cycle for re-transfer. Finally, the compiler examines and processes the packets in the cluster A2 destined to the cluster A3 which is marked with no end-of-process check.

When the count of the output port #3 in the valid port counter VPC is decreased by one and the cluster A2 in the access list ALcur is marked with an end-of-process check, the procedure is completed. FIG. 17 illustrates the access list ALcur with one packet in each of the clusters A0 to A3 having been processed. FIG. 18 illustrates the valid port counter VPC with one packet in each of the clusters A0 to A3 having been processed.

Figure 19:
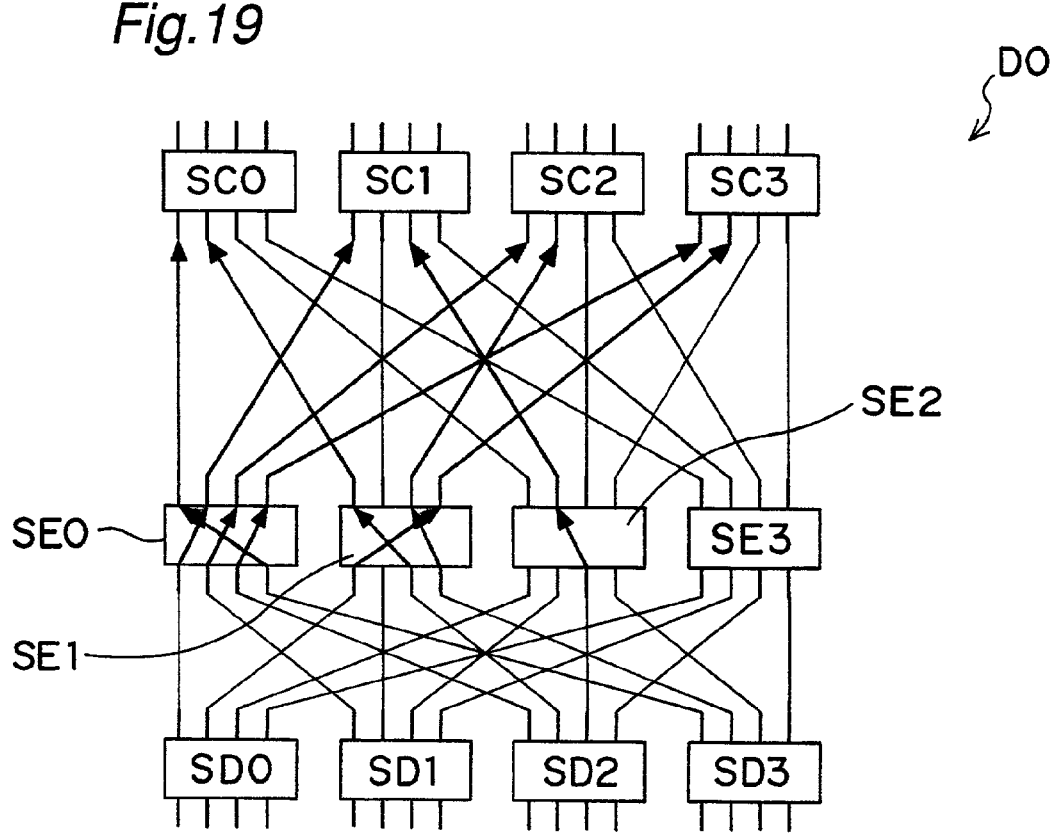
FIG. 19 is a diagram showing the route of each packet after the scheduling.

The compiler then repeats the same process over another access list ALcur. This process is differentiated from the preceding by the fact that the output ports of the switching element SE1 are involved. As the access list ALnew is turned back to the access list ALcur, the switching element handled by the compiler is shifted from one to another. In the end, the routes of packets scheduled by the compiler are such as denoted by the arrows in FIG. 19. In FIG. 19, the packets transfer within the same level-0 cluster are not shown because of simplicity of explanation.

The foregoing description is simply an example of the scheduling process by the compiler where the priority arbitration is conducted when two or more packets demand the connection to a particular output port at the same time and the packets other than the priority given packet are allowed to repeat their demand for connection to the output port through the switching status table at the succeeding occasion. Alternatively, the other packets may demand the connection to the output port through the switching status table at any other timing such as the preceding time.

As described, the multi-processor system apparatus of the first embodiment has groups of processor elements interconnected by a multi-stage interconnection network of the multiple stage connection arrangement, and each of switching elements provided in the multi-stage interconnection network is preliminarily subjected the static scheduling action of a compiler for emulation with no collision of data. Since the scheduling of packets which is dynamically conducted upon the event of collision in the prior art is fully managed by the compiler, the hardware construction required for known dynamic scheduling of the packets, such as an FIFO module, can significantly be reduced in the size. Also, the non-synchronous execution of the network system between the processor elements can favorably be improved. Moreover, as the multi-processor system apparatus is enabled to perform at non synchronous timing, the hardware arrangement for synchronous actions can be declined in the overhead thus increasing the efficiency of parallel processing actions.

When packets are transferred within clos network provided as the basic network in the multi-stage interconnection network of the multiple stage connection construction, their scheduling over each switching element of the exchanger at Level 1 may be conducted with the other packets than the priority given packet being transferred through free ports of the other switching element in the exchanger at Level 1. Accordingly, the transfer of packets can be improved in the efficiency.

Second Embodiment

According to the first embodiment of the present invention, all the packets may be dispatched towards the second stage at Level 1 of the exchanger for connection between the two clos networks or each of the switching elements SE0 to SE3 in clos network shown in FIG. 6, thus developing a hot spot at the local and declining the overall performance. For compensation, the concentrator at Level 1 may additionally be provided as the switch for downward transferring data from the upper stage to the lower stage. This is implemented by the second embodiment of the present invention. The arrangement of a multi-processor system apparatus and the arrangement of its processor elements according to the second embodiment are identical to those shown in the block diagrams of FIGS. 1 and 2 and will be explained in no more detail.

Figure 20:
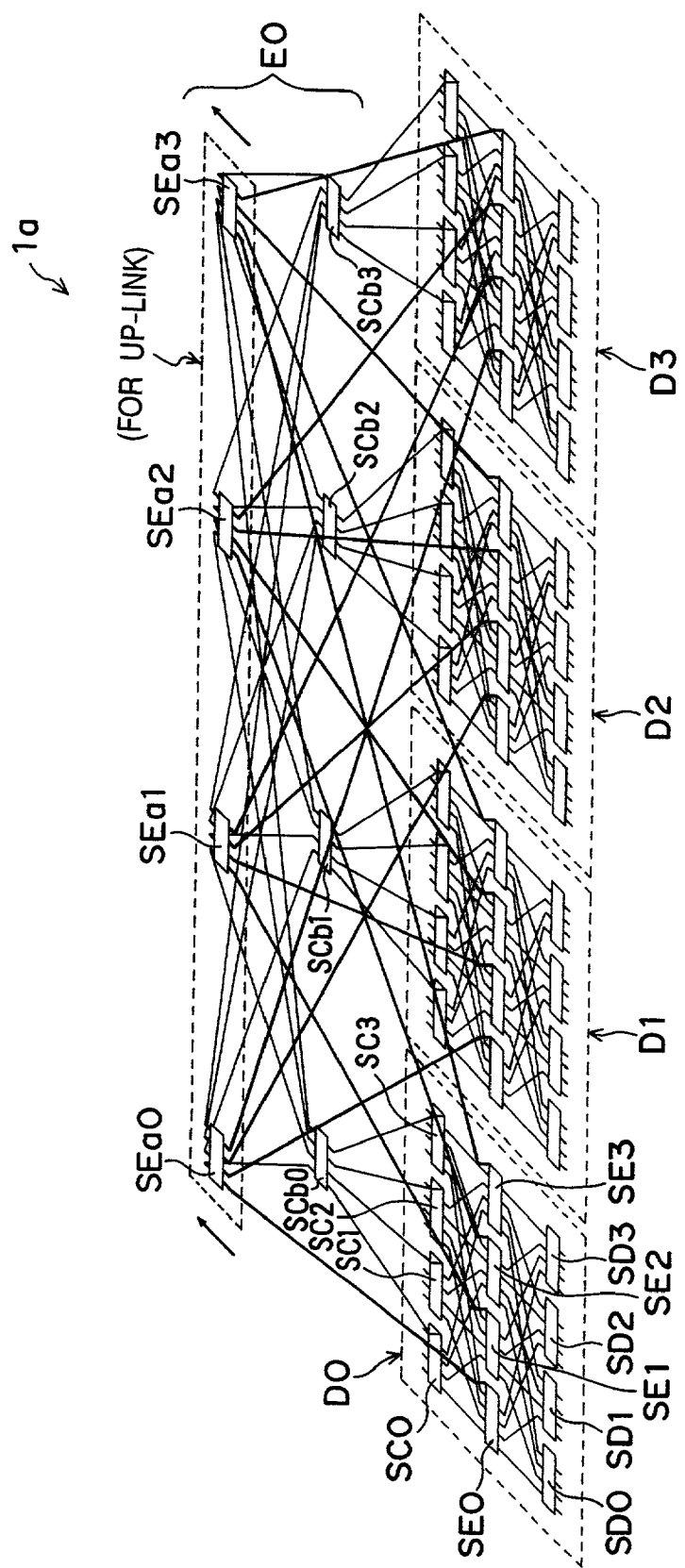
FIG. 20 is a view of a multiple stage clustering arrangement of a multi-processor system apparatus showing the second embodiment of the present invention.
Figure 21:
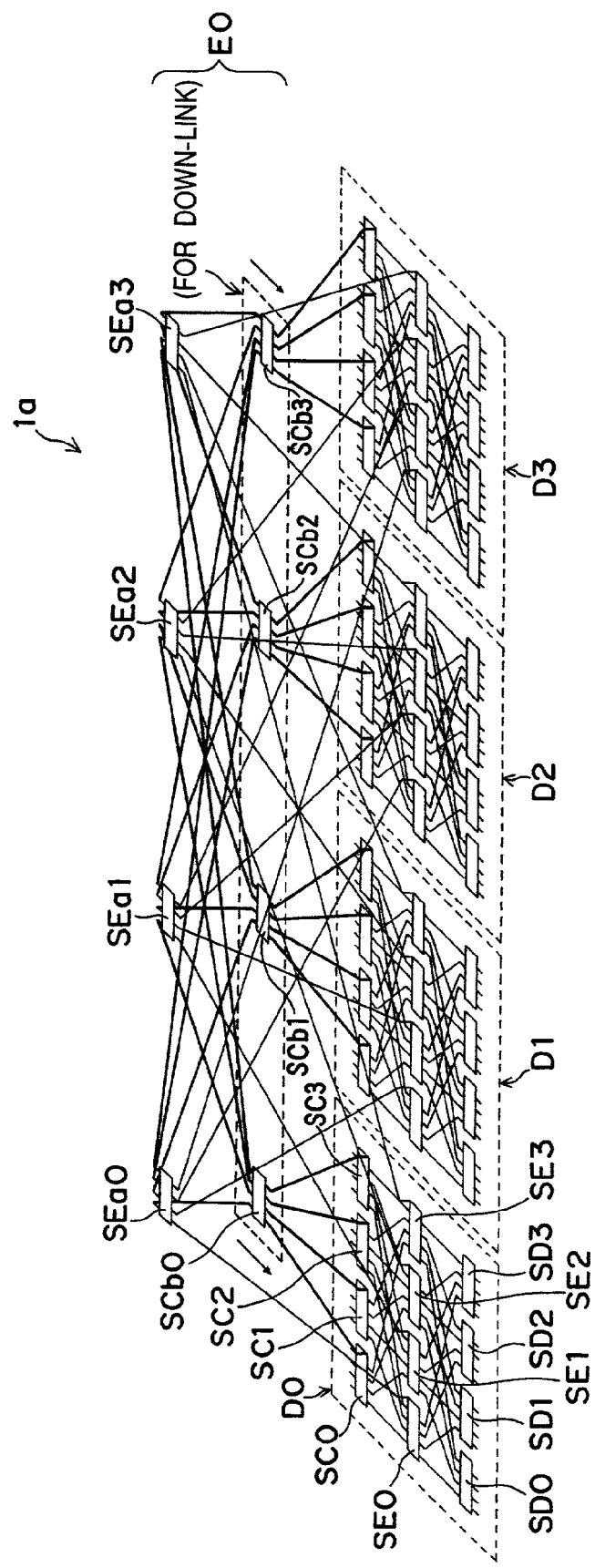
FIG. 21 is a view of the multi-processor system apparatus of FIG. 20 showing a down-link connection between clos networks and an extension network.

FIGS. 20 and 21 are diagrams of a multi-processor system apparatus of a multiple stage clustering arrangement showing the second embodiment of the present invention. FIG. 20 illustrates an up-link connection between clos networks and an extension network. FIG. 21 illustrates a down-link connection between clos networks and the extension network. Throughout FIGS. 20 and 21, like components are denoted by like numerals as those shown in FIG. 6. Accordingly, those will be explained not in detail but in respect to differences. Also, as based on the basic number of four, the multiple stage clustering arrangement shown in FIGS. 20 and 21 comprises four clusters D0 to D3, each cluster including four sub clusters A0 to A3 and each sub cluster comprising four processor elements PE0 to PE3. The processor elements are not illustrated for simplicity of the description.

The arrangement shown in FIGS. 20 and 21 is differentiated from that shown in FIG. 6 by the fact that the exchanger at Level 1 is separated into two functions, packet transfer to the upper stage network (up-stream) and packet transfer to the lower stage network (down-stream). More specifically, the concentrator at Level 1 comprising switching elements SCb0 to SCb3 is provided as a switching network for downward transfer of packets from the upper stage to the lower stage while the upward transfer of packets from the lower stage to the upper stage is carried out by the exchanger at Level 1 including switching elements SE0 to SE3 of each of the clusters D0 to D3 equal to those of the first embodiment.

When the exchange of data with the processor PU in another processor element PE is demanded by the processor PU in one processor element PE, the data is first written into the memory ME of the another processor element PE. As the data is then read out from the memory ME by the processor PU of another processor element PE, its transfer is completed.

The exchange of data between the processor elements will now be described referring to FIG. 22.

Figure 22:
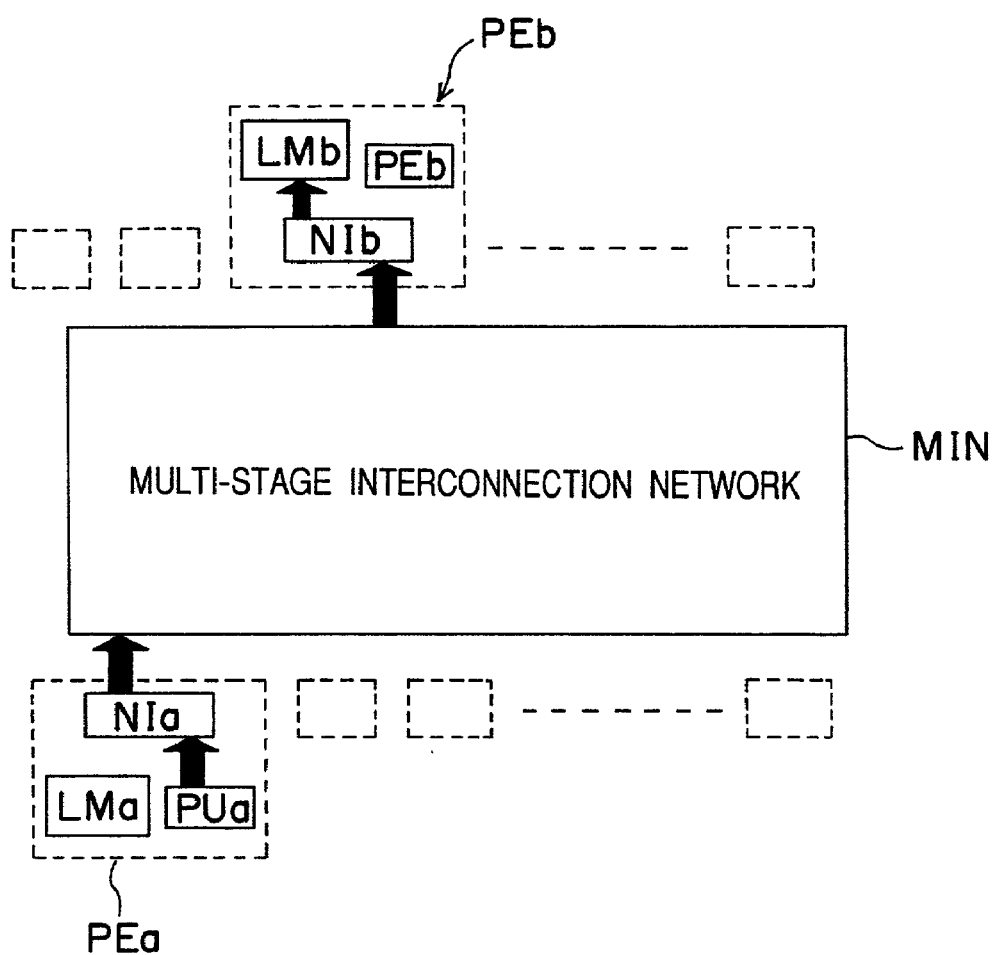
FIG. 22 is a diagram showing a transfer of data between two processor elements.

As shown in FIG. 22, the transfer of data is carried out from a processor element PEa to a processor element PEb. First, the data is passed from a processor PUa to a network interface NIa in the processor element PEa.

The network interface NIa generates packets of the data according to an address data received and releases them into a multi-stage interconnection network MIN of the multiple stage connection arrangement. The packets are then delivered by the action of the multi-stage interconnection network MIN to an network interface NIb in the processor element PEb. The network interface NIb extracts the data from its packets and saves it in a memory MEb. As the data is read out from the memory MEb by a processor PUb, the transfer of the data to the processor element PEb is completed.

A procedure where a packet released from the exchanger at Level 1 is handled or received at a destination in the same clos network will be explained referring to FIG. 3.

As shown in FIG. 3, the packet from a processor element is received by the distributor at the first stage where it is switched and delivered to the exchanger at Level 1 of the second stage. The packet is then transferred by the action of the exchanger at Level 1 to the concentrator at Level 0 of the final stage.

As the packet is received and switched by the concentrator at Level 0, it is transferred to a processor element at the destination where the transfer of data through the multi-stage interconnection network MIN of the multiple stage connection arrangement is ended up. The packet received at the destination is saved in the memory of the processor element as described with FIG. 22.

Figure 23:
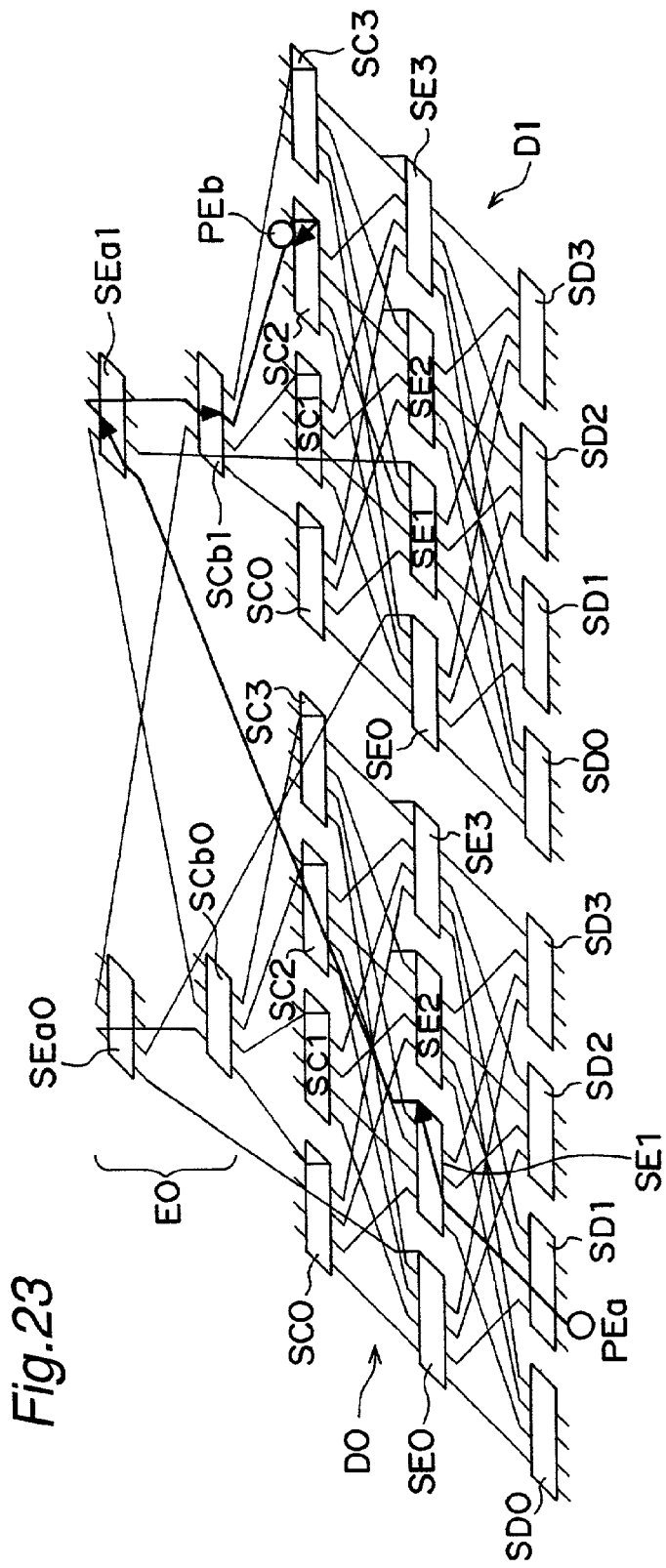
FIG. 23 is a diagram showing a transfer of packets between the processor elements in the multi-processor system apparatus 1a shown in FIG. 20.

A procedure where a packet released from the exchanger at Level 1 is handled or received at a destination in another clos network will be explained referring to FIG. 23. FIG. 23 illustrates the transfer of data from a processor PEa to a processor PEb.

As the packet is received and switched by a switching element SE1 in the exchanger at Level 1, it is delivered to an output port of the extension stage. More specifically, the packet is received by a switching element SEa1 in the exchanger at Level 2 of the higher stage before it is accepted by the cluster at the same level.

The packet in the cluster at the same level is then downwardly conveyed by a proper switching action. For example, as the packet is received and switched by the switching element SEa1, it is downwardly transferred to a switching element SCb1 of the concentrator at Level 1 shown in FIG. 23. Then, the packet is switched and transferred by the action of the switching element SCb1 to a processor element PEb at the destination. As the packet is received at the destination, the transfer of data through the multi-stage interconnection network MIN is ended up. In the arrangement, the static scheduling action of the multi-stage interconnection network having multiple stages is identical to that of the first embodiment and will be explained in no more detail.

As described, the multi-processor system apparatus of the second embodiment has the switching elements SCb0 to SCb3 of the concentrator at Level 1 arranged as the switch for downward transfer of data packets from the upper stage to the lower stage while the switching elements SE0 to SE3 of the exchanger at Level 1 are used for upward transfer of data packets from the lower stage to the upper stage. This allows the packets to be inhibited from gathering at the exchanger at Level 1 for connection between clos networks and thus generating any hot spot, hence contributing to the improvement of the multi-processor system apparatus.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A multi-processor system apparatus having a plurality of processors connected to each other by a network arrangement, comprising:

a multiplicity of processor elements, each processor element including a processor, a memory, and an interface for connection with said network arrangement; and an array of multi-stage interconnection networks having a multiple stage connection arrangement where multiple stages of switching elements are provided for interconnection between said processor elements, wherein said processor elements and said multi-stage interconnection networks are grouped to clusters based on a specific number and arranged in multiple levels and the transfer of data packets between said processor elements is conducted according to a schedule statically determined with the use of switching state tables which are generated at different timings and indicate the status of the switching elements in said multi-stage interconnection networks, wherein said multi-stage interconnection networks of a multiple stage connection arrangement, comprise two paths, respectively, of an upstream linking network for upward transfer of data packets from the lower stage to the upper stage and of a downstream linking network for downward transfer of data packets from the upper stage to the lower stage.

2. The multi-processor system apparatus according to claim 1, wherein said switching status table comprises data of a packet assigned to a particular output port, data of other packets demanding the connection to the output port, and data of the status of the output port of each switching element.

3. The multi-processor system apparatus according to claim 1, wherein when the connection to the output port of any switching element is demanded by two or more packets at the same timing, the transfer of packets between said processor elements is conducted as scheduled across said multi-stage interconnection networks so that a packet not assigned to the output port through a specific manner of arbitration is permitted to demand the output port with a switching status table at another timing.

4. The multi-processor system apparatus according to claim 3, wherein said multi-stage interconnection networks are of a cross connection arrangement and when the connection to the output port of any switching element is demanded by two or more packets at the same timing, the transfer of packets between said processor elements is conducted as scheduled across said multi-stage interconnection networks so that a packet not assigned to the output port through a specific manner of arbitration is permitted to demand another output port which is not demanded by other packets.

5. The multi-processor system apparatus according to claim 1, wherein the scheduling for each packet is preliminarily conducted by a compiler.

* * * * *